United States Patent
Orfanos

(10) Patent No.: US 12,385,472 B2
(45) Date of Patent: Aug. 12, 2025

(54) SYSTEMS FOR INSTALLING ON A WIND TURBINE TOWER MOVING OBJECTS MONITORING DEVICES AND/OR MOVING OBJECTS COLLISION PREVENTION DEVICES

(71) Applicant: Vasileios Orfanos, Athens (GR)

(72) Inventor: Vasileios Orfanos, Athens (GR)

( * ) Notice: Subject to any disclaimer, the term of this patent is extended or adjusted under 35 U.S.C. 154(b) by 0 days.

(21) Appl. No.: 18/292,172

(22) PCT Filed: Jul. 26, 2022

(86) PCT No.: PCT/GR2022/000038
§ 371 (c)(1),
(2) Date: Jan. 25, 2024

(87) PCT Pub. No.: WO2023/007197
PCT Pub. Date: Feb. 2, 2023

(65) Prior Publication Data
US 2025/0122864 A1 Apr. 17, 2025

(30) Foreign Application Priority Data
Jul. 26, 2021 (GR) .............................. 20210100503

(51) Int. Cl.
*F03D 80/10* (2016.01)
*F03D 80/00* (2016.01)

(52) U.S. Cl.
CPC ............. *F03D 80/10* (2016.05); *F03D 80/00* (2016.05)

(58) Field of Classification Search
CPC ......... F03D 80/10; F03D 80/00; G03B 17/56; G08B 13/196; H04R 1/02
See application file for complete search history.

(56) References Cited

U.S. PATENT DOCUMENTS

| | | | |
|---|---|---|---|
| 9,567,982 B1* | 2/2017 | Gozewski | E04B 1/92 |
| 2009/0096918 A1* | 4/2009 | Montelongo | H04N 23/51 348/375 |
| 2010/0239241 A1* | 9/2010 | Chou | G08B 13/19619 396/427 |
| 2015/0212393 A1* | 7/2015 | Heilweil | G03B 17/561 396/427 |
| 2017/0142374 A1* | 5/2017 | Berg | G08B 13/19684 |
| 2020/0185811 A1* | 6/2020 | Willemsen | H01Q 1/44 |

(Continued)

*Primary Examiner* — Aaron R Eastman
(74) *Attorney, Agent, or Firm* — David R. Stevens; Stevens Law Group

(57) ABSTRACT

A system for installing on a wind turbine tower at least one moving objects monitoring device and/or at least one moving objects collision prevention device, comprising: a mounting base (1) adapted to be mounted on the tower and comprising a flat surface (A) and at least one pair of opposite walls (2, 2'), a box (10) for installing the aforementioned devices comprising a flat base (11) and four sides (12, 12', 12", 12"'), wherein the box (10) is adapted to be connected to the mounting base (1) to form a closed space inside the box (10) and comprises at least one opening (13, 13', 13"), and at least one supporting base (14, 14', 14") for supporting the aforementioned devices on the flat base (11) so that only the part which is necessary to be located outside the box (10) for performing the monitoring and/or collision prevention functions protrudes from the opening (13, 13', 13").

11 Claims, 2 Drawing Sheets

(56) References Cited

U.S. PATENT DOCUMENTS

| | | | |
|---|---|---|---|
| 2022/0139181 A1* | 5/2022 | Dos Reis | G08B 19/00 |
| | | | 348/373 |
| 2022/0228570 A1* | 7/2022 | Larsen | E02B 17/0021 |
| 2023/0083359 A1* | 3/2023 | Ribeiro | H05K 5/0213 |
| | | | 361/807 |
| 2024/0329498 A1* | 10/2024 | Maekawa | G03B 17/561 |

* cited by examiner

SYSTEMS FOR INSTALLING ON A WIND TURBINE TOWER MOVING OBJECTS MONITORING DEVICES AND/OR MOVING OBJECTS COLLISION PREVENTION DEVICES

TECHNICAL FIELD

The present invention generally relates to the technical field of wind turbines and specifically relates to a system for installing on a tower of a wind turbine at least one moving objects monitoring device and/or at least one moving objects collision prevention device. Moving objects can be animals (flying or non-flying), moving vehicles (flying or non-flying), etc. An example of flying vehicles is the unmanned aerial vehicles (drones).

State of the Art

Today, it is known using systems for installing on a wind turbine tower moving objects monitoring devices and/or moving objects collision prevention devices, which systems include a mounting base for at least one monitoring device (e.g., an imaging camera) and/or at least one moving objects collision prevention device (e.g. speaker) on the wind turbine tower wherein the entire moving objects monitoring device and the entire moving objects collision prevention device protrude from the mounting base. Also, in the existing systems, the installation on the wind turbine tower is achieved by means of an array of magnets placed at specific points on the surface of the mounting base so that the wall of the tower is not in contact with the entire surface of the mounting base but only with the points of the surface of the mounting base on which the magnets are placed and thus a large gap is created between the wall of the tower and the surface of the mounting base.

The fact that in the above mentioned existing systems the entire moving objects monitoring device and the entire moving objects collision prevention device protrudes from the mounting base as well as the fact of the presence of the above mentioned large gap between the wall of the tower and the surface of the mounting base has a negative effect, especially in the case of adverse weather conditions such as snowfall or rainfall or freezing on the outer wall of the tower. For example, in the case of snowfall, ice falls from the blades or from the nacelle of the wind turbine to the aforementioned devices which protrude entirely from the mounting base resulting in damage or even destruction of these devices. Furthermore, the above fall of the ice, but also the sliding of the ice that is accumulated in areas along the length of the entire tower, in the gap between the wall of the tower and the surface of the mounting base, can have the negative effect of moving the mounting base from its position on the wall of the tower, which mounting base is in contact with the wall of the tower only at the specific points where the magnets are placed, as mentioned above.

SUMMARY OF THE INVENTION

The object of the present invention is to advantageously address the disadvantages and shortcomings of the current systems.

This invention discloses a system for installing on a tower of a wind turbine at least one moving objects monitoring device and/or at least one moving objects collision prevention device, the system comprising a mounting base of the moving objects monitoring device and/or the moving objects collision prevention device on the tower of the wind turbine, wherein the mounting base is adapted to be mounted on the tower of the wind turbine.

The system of the present invention is characterized in that:
the mounting base comprises a flat surface (A) preferably in the shape of quadrilateral and at least one pair of opposite walls each of which extending perpendicularly to the flat surface (A) along each of the two opposite sides of the flat surface (A),
and in that the system comprises:
a box for installing the moving objects monitoring device and/or the moving objects collision prevention device, wherein the box comprises a flat base preferably in the shape of a quadrilateral and four sides extending perpendicularly to the flat base and circumferentially thereto, wherein the two opposite sides of the box and the two opposite walls of the mounting base are adapted to be connected to each other so as to form a closed space inside the box between the flat base of the box, the flat surface (A) of the mounting base and the four sides of the box, wherein the flat base of the box comprises at least one opening of such dimensions that from the at least one opening passes through and protrudes therefrom the part of the moving objects monitoring device and/or the part of the moving objects collision prevention device necessary to be located outside the box in order to perform the monitoring of moving objects or in order to prevent collision of moving objects with the tower of the wind turbine,
at least one supporting base for the moving objects monitoring device and/or the moving objects collision prevention device adapted to support the moving objects monitoring device or the moving objects collision prevention device, wherein the at least one supporting base and the flat base of the box are adapted to be connected to each other in the region of the flat base of the box where the at least one opening is located such that said devices are fixed on the flat base of the box in such a manner that only the part of said devices necessary to be located outside the box in order to perform the monitoring of moving objects or in order to prevent the collision of moving objects with the tower of the wind turbine protrudes from the opening whilst the rest part of said devices is enclosed within said closed space inside the box.

It is to be noted that the above system of the invention advantageously addresses the problem of damage or destruction of the moving objects monitoring devices and/or the moving objects collision prevention devices referred to in the state of the art since only the part of the above mentioned devices which is necessary to be outside of the box in order to perform the monitoring or the collision prevention of moving objects protrudes from the opening of the box whilst the other part of the above mentioned devices is enclosed within the closed space inside the box. The fact that a part of the above mentioned devices is enclosed within the closed space inside the box results in that this part is protected and thereby the likelihood of damage or destruction of the above mentioned devices is reduced.

According to an embodiment of the invention, the mounting base is adapted to be mounted on the tower of the wind turbine by means of at least one elongated fastening means having two ends and an adequate length for surrounding the perimeter of the tower of the wind turbine at the mounting height of the system such that after having surrounded the perimeter of the tower its two ends are adapted to be connected to each other in order to achieve the fastening of the mounting base on the tower.

According to another embodiment of the invention, each of the two opposite walls of the mounting base comprises at least one hole so that the at least one elongated fastening means passes through the at least one hole of each of the two opposite walls traversing the front part of the flat surface (A) of the mounting base from the one wall to the other wall of the mounting base so that after connecting the two ends of the at least one fastening means the mounting base is mounted on the tower of the wind turbine with the entire rear part of the flat surface (A) of the mounting base being in contact with the wall of the tower, and where each of the two opposite sides of the box comprises at least one hole located at such a point of each of the two opposite sides so as to overlap with the corresponding at least one hole of each of the two opposite walls of the mounting base after the connection of the two opposite sides of the box with the two opposite walls of the mounting base, so that the at least one fastening means passes simultaneously from the at least one hole of each of the two opposite sides of the box and from the at least one hole of each of the two opposite walls of the mounting base traversing the front part of the flat surface (A) of the mounting base from the one wall to the other wall of the mounting base.

It is to be noted that the above mentioned embodiment of the invention advantageously addresses the problem of movement of the mounting base referred to in the state of the art since the entire rear part of the flat surface (A) of the mounting base is in contact with the wall of the tower resulting in significantly increased friction between the wall of the tower and the mounting base compared to existing systems wherein the mounting base is in contact with the wall of the tower only at the specific points where the magnets are placed. Also, since in the system of the invention the entire rear part of the flat surface (A) of the mounting base is in contact with the wall of the tower, no gap is formed between the mounting base and the wall of the tower, in which gap ice could for example slide or fall and provoke the movement of the mounting base as in the case of the existing systems.

According to yet another embodiment of the invention, the mounting base comprises at least one fastening means guide fixed to at least one area of the front part of surface (A) of the mounting base through which passes the at least one fastening means traversing the front part of the surface (A) from the one wall to the other wall of the mounting base, wherein the at least one guide comprises two walls fastened opposite to each other on the front part of the surface (A) at such a distance from each other that the at least one fastening means is able to pass between said walls of the fastening means guide.

According to another embodiment of the invention, the at least one fastening means is a strap or a chain or a rope, wherein the rope is preferably a wire rope.

According to an embodiment of the invention, at least one of the two opposite walls of the mounting base comprises at least one opening adapted to receive and fix at least one removable bracket on said at least one of the two opposite walls, wherein the at least one removable bracket comprises at least one magnet on its surface so that the attraction force exerted by the magnet on the wind turbine tower wall assists in holding the mounting base on the tower during the mounting of the mounting base on the tower, wherein the at least one removable bracket is adapted to be inserted into said at least one opening only during mounting the mounting base to the tower and to be extracted from said at least one opening after the completion of mounting of the mounting base on the tower.

According to another embodiment of the invention, at least a portion of the rear part of the flat surface (A) of the mounting base consists of a slip resistant material.

According to an embodiment of the invention, the two opposite sides of the box and the two opposite walls of the mounting base are adapted to be connected to each other by means of screwing components.

According to another embodiment of the invention, the at least one supporting base and the flat base of the box are adapted to be connected to each other by screwing components.

According to an embodiment of the invention, the moving objects collision prevention device is a speaker or a flashing lamp.

According to another embodiment of the invention, the moving objects monitoring device is an imaging camera or a thermal imaging camera or a security camera of which cameras only the image sensor protrudes outside the box.

According to an embodiment of the invention, the imaging camera or the thermal imaging camera or the security camera are dome cameras of which only the dome including the image sensor protrudes outside the box.

A wind turbine comprising at least one installation system as described in the above mentioned embodiments is also proposed in the present invention.

BRIEF DESCRIPTION OF THE DRAWINGS

The invention will be fully disclosed to those skilled in the art with reference to the accompanying drawings which show in an indicative rather than limiting manner preferred embodiments of the system for installing on the tower of a wind turbine at least one moving objects monitoring device and/or at least one moving objects collision prevention device. The above mentioned installation system is called "nvbird".

FIG. 4 also shows in perspective view an illustrative embodiment of the supporting base for the imaging camera, the supporting base for the speaker and the supporting base for the security camera before these three supporting bases are connected to the flat base of the box of FIGS. 1 and 3 in the area of the flat base where the three openings of the box are located. The above mentioned supporting bases are part of the installation system of FIG. 1.

DETAILED DESCRIPTION OF PREFERRED EMBODIMENTS

Referring now to the accompanying drawings, we will describe preferred embodiments of the invention.

Figure 1:
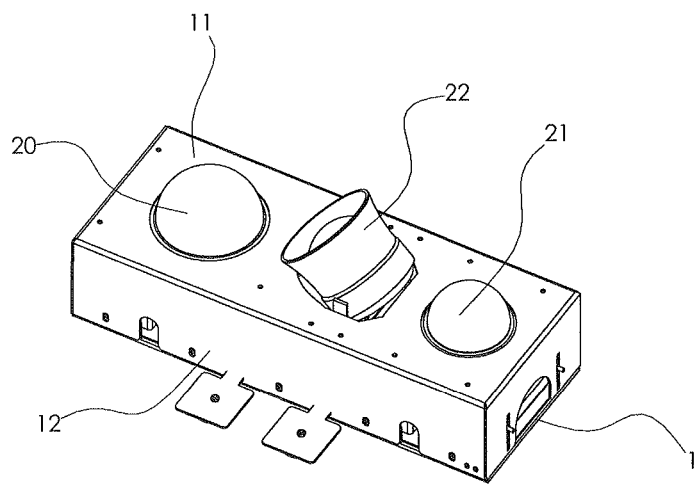
FIG. 1 illustrates a perspective view of a system for installing an imaging camera, a speaker and a security camera on the tower of a wind turbine according to an illustrative embodiment of the invention, wherein this installation system comprises a mounting base of the imaging camera, the speaker and the security camera on the wind turbine tower and a box for installing the imaging camera, the speaker and the security camera, wherein the mounting base is connected to this box. The installation system of FIG. 1 also comprises a supporting base for the imaging camera, a supporting base for the speaker and a supporting base for the security camera, wherein all the three above mentioned supporting bases are not shown in the assembled installation system of FIG. 1 because they are located inside the above mentioned box and specifically they are connected to the flat base of this box.
Figure 2:
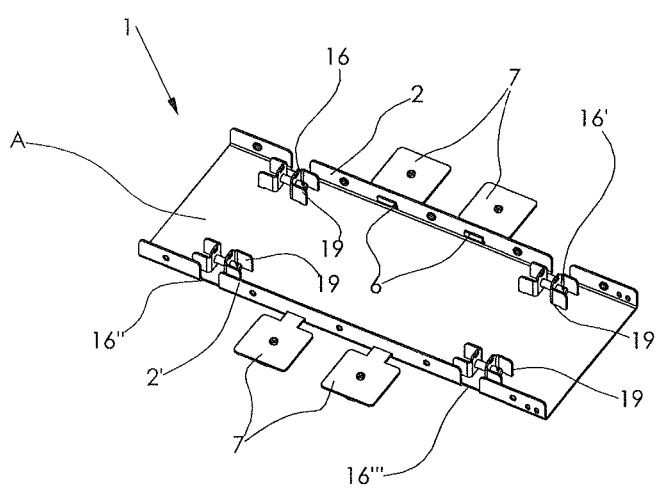
FIG. 2 illustrates a perspective view of the mounting base of FIG. 1 before its connection to the box of FIG. 1, wherein four removable brackets are fixed to the walls of the mounting base and each of the four brackets comprises a magnet on its center.
Figure 4:
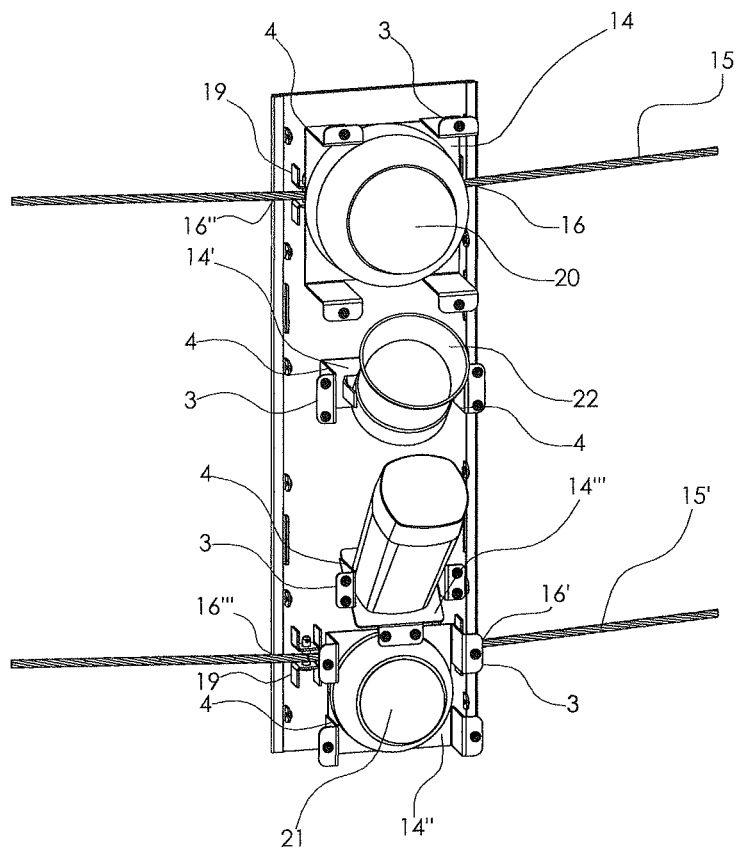
FIG. 4 illustrates a perspective view of the mounting base of FIGS. 1 and 2 after its mounting (via fastening with a rope) on the tower of the wind turbine, wherein the removable brackets of FIG. 2 have been removed after the mounting and therefore are not shown in FIG. 4.

As shown in FIGS. 1, 2 and 4 the system for installing on the tower of a wind turbine at least one moving objects monitoring device and/or at least one moving objects collision prevention device comprises a mounting base (1) of the moving objects monitoring device and/or of the moving objects collision prevention device on the tower of the wind turbine. As shown in FIG. 2, the mounting base (1) consists of a flat surface (A) preferably in the shape of a quadrilateral and of a pair of opposite walls (2, 2') each of which extending perpendicularly to the flat surface (A) along the length of each one of the two opposite sides of the flat surface (A). The mounting base (1) of FIGS. 1, 2 and 4 is in the shape of a rectangular but according to other examples not shown in the drawings it may have another shape, e.g. a shape of a square.

Also, as shown in FIG. 4, the mounting base (1) is adapted to be mounted on the tower of the wind turbine by fastening means and in particular by means of two ropes (15, 15') each one of them having two ends and such a length that they can surround the perimeter of the wind turbine tower at the installation height of the system and after each one of the two ropes (15, 15') has surrounded the perimeter of the tower the two ends of each rope (15, 15') can be connected to each other for achieving the mounting of the mounting base (1) on the tower. According to an example not shown in the drawings, the two ends of each rope (15, 15') are connected to each other by tying one end to the other end or are connected to each other by a tensioner. Also, according to another example not shown in the drawings, in the case of using a tensioner to connect the two ends of each rope (15, 15'), at least one spacer is placed circumferentially on the outer wall of the tower so that each rope (15, 15') which surrounds the perimeter of the tower passes through the spacer. The spacer is adapted to keep each rope (15, 15') passing through the spacer at such a distance from the outer wall of the tower that the tensioner does not come into contact with the tower.

In addition, as shown in FIGS. 2 and 4, each one of the two opposite walls (2, 2') of the mounting base (1) includes two holes so that the rope (15) passes through each one of the two opposite holes (16, 16") and the rope (15') passes through each one of the two opposite holes (16', 16'") traversing the front part of the flat surface (A) of the mounting base (1) from one wall (2) to the other wall (2') of the mounting base (1) so that after connecting the two ends of each rope (15, 15') the mounting base (1) is mounted on the tower with the entire rear part of the flat surface (A) of the mounting base (1) being in contact with the wall of the tower. According to an example, at least an area (preferably the entire area) of the rear part of the flat surface (A) of the mounting base (1) consists of slip resistant material (e.g. rubber) with a high anti-slip coefficient such that it becomes even more difficult for the mounting base (1) to move, for example in case of adverse weather conditions.

According to another example illustrated in FIGS. 2 and 4, the mounting base (1) comprises four rope guides (19) fixed at four different areas of the front part of the surface (A) of the mounting base (1) through which the ropes (15, 15') pass traversing the front part of the flat surface (A) of the mounting base (1) from the one wall (2) to the other wall (2') of the mounting base (1). More specifically, in the example of FIGS. 2 and 4, each rope passes through two guides (19) and each of the four guides (19) comprises two walls fixed (e.g. with screwing components such as screws) opposite to each other on the front part of the surface (A) at such a distance from each other (the distance between the two walls must correspond to the diameter of the ropes) that the ropes (15, 15') can pass between these walls and that each guide (19) guides the ropes (15, 15') traversing the front part of the flat surface (A) of the mounting base (1) from the one wall (2) to the other wall (2') of the mounting base (1). According to another example not shown in the drawings, each rope could pass through only one guide (19) or through more than two guides (19).

According to another example illustrated in FIG. 2, each of the two opposite walls (2, 2') of the mounting base (1) comprises two openings (6) adapted to receive and fix on each one of the two opposite walls (2, 2') two removable brackets (7). According to an example not shown in the drawings, the above mentioned fixation can be done with screwing components. Each one of the four in total removable brackets (7) of FIG. 2 includes a magnet in the center of its surface so that the attraction force exerted by the magnet on the wall of the tower assists in mounting the mounting base (1) on the tower during the mounting of the mounting base (1) on the tower. The four removable brackets (7) are adapted to be inserted in the four openings (6) only during the mounting of the mounting base (1) on the wind turbine tower and to be extracted from the four openings (6) after the completion of the mounting of the mounting base (1) on the tower since after the completion of the above mounting the mounting base (1) is fastened and held to the tower by the ropes (15, 15'). According to another example not shown in the drawings, each one of the two opposite walls (2, 2') of the mounting base (1) comprises one or more than two openings (6) adapted to receive and fix one or more removable brackets (7) on each one of the two opposite walls (2, 2').

According to an example, the ropes (15, 15') are wire ropes. According to another example, instead of ropes, straps or chains or adjustable hoops or similar elongated fastening means could be used to mount the mounting base (1) to the tower of the wind turbine. Also, in another example not shown in the drawings, only one rope could be used to mount the mounting base (1) but it is evident that it is preferable to use two or more ropes to increase the mounting stability of the mounting base (1) on the tower of the wind turbine.

Figure 3:
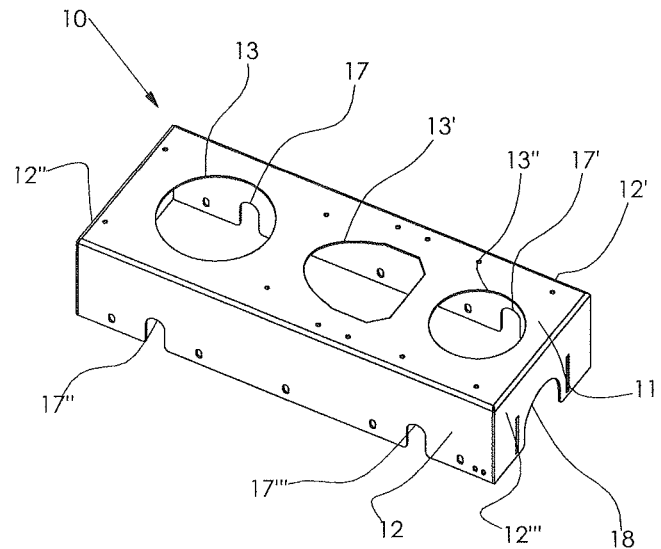
FIG. 3 illustrates a perspective view of the box of FIG. 1 before its connection to the mounting base of FIG. 1, wherein the flat base of the box includes three openings of such dimensions that only the part of the imaging camera, the speaker and the security camera which must be located outside the box in order to perform the monitoring and prevent collision of moving objects passes through and protrudes from the three openings.

As shown in FIGS. 1 and 3, the installation system comprises (in addition to the mounting base (1)) a box (10) for the installation of an imaging camera (20), of a speaker (22) that emits bird deterrent sounds and of a security camera (21). The box (10) comprises a flat base (11)

preferably in the shape of a quadrilateral and four sides (12, 12', 12", 12''') extending perpendicularly to the flat base and around the perimeter of the flat base. The box (10) of FIGS. 1 and 3 is in a shape of a rectangular prism but according to other examples not shown in the drawings it may have another shape, e.g. a square shape. Also, the shape and the perimeter of the flat base (11) of the box (10) correspond to the shape and the perimeter of the flat surface (A) of the mounting base (1).

As shown in FIGS. 1, 2 and 3, the two opposite sides (12, 12') of the box (10) and the two opposite walls (2, 2') of the mounting base (1) are adapted to be connected to each other so that a closed space is formed inside the box (10) between the flat base (11) of the box (10), the flat surface (A) of the mounting base (1) and the four sides (12, 12', 12", 12''') of the box (10). According to the example of FIGS. 1, 2 and 3, the two opposite sides (12, 12') of the box (10) comprise five holes and respectively the two opposite walls (2, 2') of the mounting base (1) comprise five holes appropriately located so that after covering the mounting base (1) with the box (10) the holes of the mounting base overlap with the holes of the box (10). After the above mentioned covering of the mounting base (1) with the box (10), screwing components pass simultaneously through the five holes of the mounting base (1) and the overlapping five holes of the box (10) thus achieving the connection by screwing of the two opposite sides (12, 12') of the box (10) with the two opposite walls (2, 2') of the mounting base (1) and actually the connection of the mounting base (1) to the box (10).

Furthermore, according to the example of FIGS. 1 and 3, each of the two opposite sides (12, 12') of the box (10) comprises two holes. Specifically, as shown in FIG. 3, the side (12) comprises two holes (17, 17') and the side (12') comprises two holes (17", 17''') of such dimensions that the ropes (15, 15') pass through them. The holes (17, 17', 17", 17''') are located at such a point on each of the two opposite sides (12, 12') of the box (10) that they overlap with the corresponding holes (16, 16', 16", 16''') of each of the two opposite walls (2, 2') of the mounting base (1) after the connection of the two opposite sides (12, 12') of the box (10) with the two opposite walls (2, 2') of the mounting base (1), so that the ropes (15, 15') pass simultaneously through the holes (17, 17', 17", 17''') of each of the two opposite sides (12, 12') of the box (10) and through the holes (16, 16', 16", 16''') of each of the two opposite walls (2, 2') of the mounting base (1) traversing the front part of the flat surface (A) of the mounting base (1) from the one wall (2) to the other wall (2') of the mounting base (1).

Also, as shown in FIGS. 1 and 3, the flat base (11) of the box (10) comprises three openings (13, 13', 13") of such dimensions that passes through and protrudes therefrom the part of the imaging camera (20), of the speaker (22) emitting bird deterrent sounds and of the security camera (21) which is necessary to be located outside the box for performing the monitoring and for preventing collision of moving objects on the wind turbine tower. In the case of the imaging camera (20) and the security camera (21), the part of the cameras protruding from the openings (13) and (13") respectively is the image sensor. Also, in the example of FIG. 1, the imaging camera (20) and the security camera (21) are dome cameras of which only the dome comprising the image sensor protrudes outside the box (10). In another example not shown in the drawings, the monitoring device is a thermal imaging camera which could also be a dome camera whilst the moving objects collision prevention device is a flashing lamp (for example a strobe lamp). In another example not shown in the drawings, the cameras of different technology (e.g. starlight technology) and type can be bullet cameras instead of dome cameras. Also, in another example not shown in the drawings, the flat base (11) of the box (10) could comprise only one opening, two openings or more than three openings through which could pass and protrude therefrom less than three or more than three devices.

As shown in FIG. 4, the installation system comprises (in addition to the mounting base (1) and the box (10)) three supporting bases (14, 14', 14") adapted to support on their flat surface the imaging camera (20), the speaker (22) and the security camera (21). According to an example, each of the three aforementioned devices is adapted to be fixed with screwing components (e.g. screws) on the respectively adapted flat surface of each of the three supporting bases (14, 14', 14") such that the three supporting bases (14, 14', 14") support each of the three aforementioned devices. According to an example, the flat base (11) of the box (10) comprises only one opening, two openings or more than three openings through which could pass and protrude less than three or more than three devices, wherein for supporting each of these devices a corresponding supporting base is used. Therefore, in another example not shown in the drawings, the installation system could comprise one or two or more than three supporting bases.

Also, as shown in FIGS. 3 and 4, the three supporting bases (14, 14', 14") and the flat base (11) of the box (10) are adapted to be connected to each other in the area of the flat base (11) of the box (10) where the three openings (13, 13', 13") are located so that the imaging camera (20), the speaker (22) and the security camera (21) are fixed on the flat base (11) of the box (10) in such a manner that protrudes from each of the three openings (13, 13', 13") only the part of each of the three aforementioned devices that is necessary to be located outside the box (10) in order to perform the monitoring of moving objects and in order to prevent the collision of moving objects with the tower. The rest part of the aforementioned three devices (e.g. the part of the wires of the three devices) that is not necessary to be outside the box (10) in order to perform the monitoring of moving objects and in order to prevent the collision of moving objects with the tower of the wind turbine is enclosed within the closed space inside the box (10).

According to the example of FIGS. 3 and 4, each of the three supporting bases (14, 14', 14") comprises at least two legs (4) with protrusions (3) located on either side of the aforementioned three devices, wherein each of the protrusions (3) extends perpendicularly to each of the legs (4) at the end of each of the legs (4) that is connected to the flat base (11). Also, each of the protrusions (3) is provided with at least one hole and the flat base (11) of the box (10) comprises a corresponding equal number of holes (see FIGS. 1 and 3) in the area of connection of each of the three supporting bases (14, 14', 14") to the flat base (11). The aforementioned holes of the protrusions (3) and the corresponding holes of the flat base (11) are appropriately positioned in order to overlap when each of the protrusions (3) is in contact with the flat base (11). After each of the protrusions (3) comes into contact with the flat base (11), screwing components pass simultaneously through the holes of the protrusions (3) and the corresponding overlapping holes of the flat base (11) thus achieving the connection of each of the three supporting bases (14, 14', 14") with the flat base (11) by screwing means. The length of the legs (4) of each of the three supporting bases (14, 14', 14") corresponds to the length of the part of the aforementioned three devices which is enclosed within the closed space inside the box (10).

According to the example of FIG. 3, the side (12''') of the box (10) comprises a hole (18) through which the wiring of the above mentioned three devices comes out of the box (10) such that the wiring is connected to a control panel which according to an example not shown in the drawings is located inside the wind turbine tower.

A wind turbine may comprise at least one installation system as described in the above mentioned examples of the detailed description of the preferred embodiments and as illustrated in the drawings. According to an example, a wind turbine comprises four installation systems which are installed to the perimeter of the wind turbine at such a distance from each other that they cover the entire range of 360 degrees around the wind turbine.

It is to be noted that the above description of the invention has been made by reference to preferred embodiments to which it is not limited. Thus, any change or modification in terms of shape, morphology, dimensions, materials being used and construction techniques is considered to be contained within the objectives and scope of the present invention.

The invention claimed is:

1. A system for installing on a tower of a wind turbine at least one moving objects monitoring device and/or at least one moving objects collision prevention device, the system comprising:
   a mounting base of the moving objects monitoring device and/or the moving objects collision prevention device on the tower of the wind turbine, wherein the mounting base is adapted to be mounted on the tower of the wind turbine,
   wherein the system is characterized in that the mounting base comprises a flat surface in a shape of a quadrilateral and at least one pair of opposite walls, wherein each wall of the pair of opposite walls extends perpendicularly to the flat surface along each of two opposite sides of the flat surface,
   and in that the system further comprises:
   a box for installing the moving objects monitoring device and/or the moving objects collision prevention device, wherein the box comprises a flat base in a shape of a quadrilateral and four sides extending perpendicularly to the flat base and circumferentially thereto, wherein a pair of opposite sides of the box and a pair of opposite walls of the mounting base are adapted to be connected to each other so as to form a closed space inside the box between the flat base of the box, the flat surface of the mounting base and the four sides of the box, wherein the flat base of the box comprises at least one opening of such dimensions that from the at least one opening passes through and protrudes therefrom the part of the moving objects monitoring device and/or the part of the moving objects collision prevention device necessary to be located outside the box in order to perform monitoring of moving objects or in order to prevent collision of moving objects with the tower of the wind turbine; and
   at least one supporting base for the moving objects monitoring device and/or the moving objects collision prevention device adapted to support the moving objects monitoring device and the moving objects collision prevention device, wherein the at least one supporting base and the flat base of the box are adapted to be connected to each other in the region of the flat base of the box where the at least one opening is located such that said devices are fixed on the flat base of the box in such manner that only the part of said devices necessary to be located outside the box in order to perform the monitoring of moving objects or in order to prevent the collision of moving objects with the tower of the wind turbine protrudes from the opening whilst the rest part of said devices is enclosed within said closed space inside the box, wherein the mounting base is adapted to be mounted on the tower of the wind turbine by means of at least one elongated fastening means having two ends and an adequate length for surrounding a perimeter of the tower of the wind turbine at a mounting height of the system such that after having surrounded the perimeter of the tower, the two ends are adapted to be connected to each other in order to achieve the fastening of the mounting base on the tower, wherein each of the two opposite walls of the mounting base comprises at least one hole so that the at least one elongated fastening means passes through the at least one hole of each of the two opposite walls traversing a front part of the flat surface of the mounting base from the one wall to the other wall of the mounting base, so that after connecting the two ends of the at least one elongated fastening means the mounting base is mounted on the tower of the wind turbine with an entire rear part of the flat surface of the mounting base being in contact with the wall of the tower, and wherein each of the two opposite sides of the box comprises at least one hole located at such a point of each of the two opposite sides so as to overlap with the corresponding at least one hole of each of the two opposite walls of the mounting base after the connection of the two opposite sides of the box with the two opposite walls of the mounting base, so that the at least one elongated fastening means passes simultaneously from the at least one hole of each of the two opposite sides of the box and from the at least one hole of each of the two opposite walls of the mounting base traversing the front part of the flat surface of the mounting base from the one wall to the other wall of the mounting base.

2. The system according to claim 1, wherein the mounting base comprises at least one elongated fastening means guide fixed to at least one area of the front part of the flat surface of the mounting base through which passes the at least one elongated fastening means traversing the front part of the surface from the one wall to the other wall of the mounting base, wherein the at least one guide comprises two walls fastened opposite to each other on the front part of the surface at such a distance from each other that the at least one elongated fastening means is able to pass between said walls of the elongated fastening means guide.

3. The system according to claim 1, wherein the at least one elongated fastening means is a strap or a rope.

4. The system according to claim 1, wherein at least one of the two opposite walls of the mounting base comprises at least one opening adapted to receive and fix at least one removable bracket on said at least one of the two opposite walls, wherein the at least one removable bracket comprises at least one magnet on its surface so that the attraction force exerted by the magnet on the wind turbine tower wall assists in holding the mounting base on the tower during the mounting of the mounting base on the tower, wherein the at least one removable bracket is adapted to be inserted into said at least one opening only during mounting the mounting base to the tower and to be extracted from said at least one opening after the completion of the mounting of the mounting base on the tower.

5. The system according to claim 1, wherein at least a portion of the rear part of the flat surface of the mounting base consists of a slip-resistant material.

6. The system according to claim 1, wherein the two opposite sides of the box and the two opposite walls of the mounting base are adapted to be connected to each other by means of screwing components.

7. The system according to claim 1, wherein the at least one supporting base and the flat base of the box are adapted to be connected to each other by screwing components.

8. The system according to claim 1, wherein the moving objects collision prevention device is a speaker or a flashing lamp.

9. The system according to claim 1, wherein the moving objects monitoring device is an imaging camera or a thermal imaging camera or a security camera of which cameras only the image sensor protrudes outside the box.

10. The system according to claim 9, wherein the imaging camera or the thermal imaging camera or the security camera are dome cameras of which only the dome including the image sensor protrudes outside the box.

11. A wind turbine comprising at least one system according to claim 1.

* * * * *